United States Patent

[11] 3,607,870

| [72] | Inventors | Friedrich Becke<br>Heidelberg;<br>Helmuth Hagen,<br>Ludwigschafen/Rhineland, both of<br>Germany |
|---|---|---|
| [21] | Appl. No. | 728,833 |
| [22] | Filed | May 13, 1968 |
| [45] | Patented | Sept. 21, 1971 |
| [73] | Assignee | Badische Anilin- & Soda-Fabrik<br>Aktiengesellschaft<br>Ludwigschafen am Rhineland-Pfalz,<br>Germany |
| [32] | Priority | May 13, 1967 |
| [33] |  | Germany |
| [31] |  | P 16 70 223.1 |

[54] PRODUCTION OF DITHIOCARBAMATES
5 Claims, No Drawings

[52] U.S. Cl..................................................... 260/246 B,
260/268 S, 260/293.4 A, 260/326.5 S,
260/501.12, 424/248
[51] Int. Cl..................................................... C07d 87/46
[50] Field of Search............................................260/501.12,
246, 293.4, 268 S, 293.4 A, 326.5 S

*Primary Examiner*—Alex Mazel
*Assistant Examiner*—Jose Tovar
*Attorney*—Johnston, Root, O'Keeffe, Keil, Thompson & Shurtleff

ABSTRACT: Production of dithiocarbamates by reacting halogenated methanes with elementary sulfur and secondary amines. The products are valuable starting materials for the production of herbicides, fungicides, insecticides, rubber auxiliaries, and stabilizers in the petroleum industry.

PRODUCTION OF DITHIOCARBAMATES

This invention relates to the production of dithiocarbamates by reaction of halogenated methanes with elementary sulfur and secondary amines.

It is known that dithiocarbamates can be prepared by reacting carbon disulfide with primary or secondary amines (Houben-Weyl, "Methoden der organischen Chemie," volume 9, page 825). The use of the toxic and explosive carbon disulfide in this method is unsatisfactory, especially on a large scale.

The object of this invention is to provide a new process for the production of dithiocarbamates by a simple method and in good yields and purity, starting from easily accessible starting materials.

This and other objects and advantages of the invention are achieved and dithiocarbamates having the general formula:

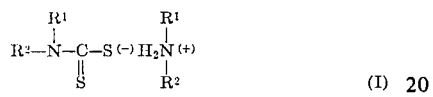  (I)

in which $R^1$ and $R^2$ may be identical or different and each denotes an aliphatic, araliphatic or cycloaliphatic radical and in which $R^1$ and $R^2$ together with the adjacent nitrogen atom may form a heterocyclic ring, are obtained by reacting a monohalogenated or dihalogenated methane with elementary sulfur and a secondary amine having the general formula:

  (II)

in which $R^1$ and $R^2$ have the above-mentioned meanings, at least about 2 gram atoms of sulfur being used for each mole of halogenated methane.

The reaction may be represented by the following formulas when using methylene chloride and diethylamine:-

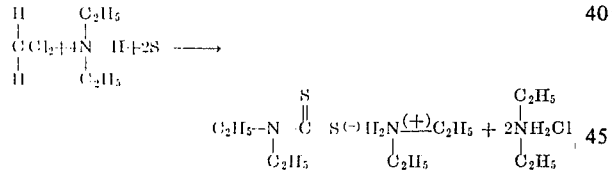

The process according to the invention uses easily accessible starting materials, gives a large number of dithiocarbamates in good purity and yield, and is easy to carry out.

Halomethanes, preferably bromomethanes, iodomethanes and particularly chloromethanes are used as starting materials. The starting materials may contain one or two, if desired different, halogen atoms in the molecule. For example the following halomethanes may be used as starting materials: methyl bromide, methylene chloride and bromochloromethane.

Elementary sulfur is another starting material for the reaction. About two gram atoms of sulfur is required per mole of halomethane for the formation of the dithiocarbamato group. The sulfur may also be used in excess. When reacting a monohalomethane it is advantageous to supply further amounts of sulfur to the reaction in order to bind the hydrogen liberated.

Secondary amines having the formula (II) are also used as starting materials. About 2 moles of the starting amine (II) per mole of halomethane is used for the formation of the dithiocarbamides. The amine may also be used in excess. Further amounts of amine are advantageously supplied to the reaction to bind the hydrogen halide liberated. Instead of the said amount of amine which serves to bind hydrogen halide, an equivalent amount of another acid-binding agent may be used. Examples of suitable agents are tertiary amines, alkali metal oxides, hydroxides, amides or alcoholates, or alkaline earth metal oxides, hydroxides, amides or alcoholates.

Preferred secondary amines (II) (and consequently preferred end products (I)) are those in whose formula (II) $R^1$ and $R^2$ are identical or different and each denotes an alkyl, aralkyl or cycloalkyl radical, each having up to 18, particularly up to 7, carbon atoms, or $R^1$ and $R^2$ together with the adjacent nitrogen atom may form a heterocyclic ring, particularly a 5 membered or 6-membered ring which may contain an oxygen atom or another nitrogen atom.

For example the following secondary amines may be used as the starting material (II);
N,N-diethylamine, N,N-dibutylamine, N,N-didodecylamine, N-cyclohexyl-N-ethylamine, N-butyl-N-methylamine, N-benzyl-N-propylamine, piperidine, morpholine, pyrrolidine and piperazine.

The reaction is carried out as a rule at a temperature of from 20° to 200° C., preferably from 50° to 150° C., at atmospheric or superatmospheric pressure, continuously or batchwise. Organic solvents which are inert under the reaction conditions, such as aromatic hydrocarbons, for example benzene, toluene or xylene; alcohols, for example methanol or ethanol; or ethers, for example dibutyl ether or dioxane.

The reaction may be carried out as follows:

A mixture of the starting materials, with or without a solvent and/or acid-binding agent, is kept at the above-mentioned temperature for 10 to 30 hours. The mixture is then cooled and the solid formed is washed with water, dried and if necessary recrystallized from water. If necessary the end product may also be separated by other conventional methods, for example by distilling off the solvent and extracting the residue with cyclohexane.

The dithiocarbamates which can be prepared by the process according to this invention are valuable starting materials for the production of herbicides, fungicides, insecticides, rubber auxiliaries, and stabilizers in the petroleum industry (cf. Ullmanns, "Encyklopadie der technischen Chemie," volume 6, pages 18 et seq.).

The invention is illustrated by the following examples. The parts specified in the following examples are parts by weight.

EXAMPLE 1 three hundred forty-eight parts of morpholine, 64 parts of sulfur and 85 parts of methylene chloride in 500 parts of ethyl alcohol are heated for 25 hours at about 85° C. Then the reaction mixture is cooled to −5° to =10° C. and the salt mixture formed is suction filtered. The salt mixture is then washed free from chlorine ions with cold water to remove morpholine hydrochloride and dried. One hundred ninety-four parts of crude morpholine morpholinodithiocarbamate:

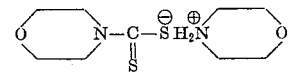

is obtained. The salt thus recovered contains a small amount of unreacted sulfur. It is recrystallized from water and 185 parts of analytically pure end product is obtained, i.e. 75 to 77 percent of the theory with reference to methylene chloride used.

EXAMPLE 2

Three hundred forty parts of piperidine, 64 parts of sulfur and 85 parts of methylene chloride are heated in 400 parts of ethyl alcohol for 20 hours at 85° C. By working up analogously to the procedure described in example 1 180 parts of the piperidine salt of piperidinodithiocarbamic acid:

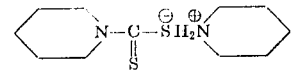

is obtained, i.e. 74 percent of the theory with reference to the methylene chloride used. It has a melting point of about 160° C., with sublimation.

EXAMPLE 3

One-hundred parts of piperidine, 64 parts of sulfur, 85 parts of methylene chloride and 360 parts of 30 percent sodium methylate solution are heated for 25 hours at about 70° to 75°20° C. The reaction mixture is cooled to about 0° C. and the salt mixture formed is then suction filtered, washed with water until free from chlorine ions and dried. One-hundred parts of piperidine piperidinodithiocarbamate is obtained, equivalent to a yield of 78 percent of the theory with reference to piperidine used.

EXAMPLE 4

Two-hundred ninety-two parts of diethylamine, 64 parts of sulfur and 85 parts of methylene chloride are heated in 400 parts of ethyl alcohol for 30 hours at about 85° C. The solvent is then distilled off and the residue is washed with ether. A gray powder remains which consists of a mixture of diethylamine hydrochloride and the dithiocarbamate. 140 parts (equivalent to a yield of 63 percent of the theory with reference to methylene chloride used) of the diethylammonium salt of N,N-di-ethyldithiocarbamic acid

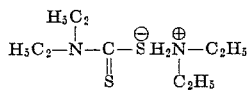

is obtained by extraction with cyclohexane.

We claim:

1. A process for the production of dithiocarbamates having the formula v,4

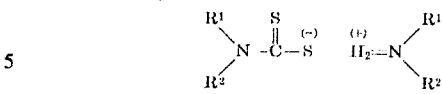

in which $R^1$ and $R^2$ are alkyl having up to 18 carbon atoms, cyclohexyl, benzyl or taken together with the nitrogen atom form piperidino, morpholino, pyrrolidino or piperazino, which process comprises reacting at 20° to 200° C. a monohalogenated or dihalogenated methane with elementary sulfur and a secondary amine having the formula:

wherein $R^1$ and $R^2$ have the above meaning, at least about 2 gram atoms of sulfur being used per mole of said halogenated methane.

2. A process as claimed in claim 1 wherein the secondary amine is used in stoichiometric excess in an amount sufficient to serve as an acid binding agent.

3. A process as claimed in claim 1 wherein an acid binding agent other than said secondary amine is added to the reaction mixture to bind the liberated acid.

4. A process as claimed in claim 1 wherein the reaction temperature is 50 to 150° C.

5. A process as claimed in claim 1 wherein the reaction is carried out in an organic solvent which is inert under the reaction conditions.

UNITED STATES PATENT OFFICE
CERTIFICATE OF CORRECTION

Patent No. 3,607,870      Dated September 21, 1971

Inventor(s) Friedrich Becke and Helmuth Hagen

It is certified that error appears in the above-identified patent and that said Letters Patent are hereby corrected as shown below:

First page, left-hand column, fourth and eleventh lines, "Ludwigschafen" should read -- Ludwigshafen --.

Column 2, line 43, "three" should read -- Three --; line 46, "=10°" should read -- -10° --.

Column 3, line 5, "7520°" should read -- 75° --; line 5, "about °C." should read -- about 0° C. --; line 7, "One-hundred" should read -- 192 --.

Column 4, line 2, "the formula v,4" should read -- the formula: --.

Signed and sealed this 25th day of April 1972.

(SEAL)
Attest:

EDWARD M. FLETCHER, JR.            ROBERT GOTTSCHALK
Attesting Officer                  Commissioner of Patents